United States Patent
Mueller et al.

(10) Patent No.: US 10,632,773 B2
(45) Date of Patent: Apr. 28, 2020

(54) MOUNTING DEVICE FOR A PRINT HEAD, A MOUNTING ASSEMBLY AND A PRINTING SYSTEM

(71) Applicant: HEIDELBERGER DRUCKMASCHINEN AG, Heidelberg (DE)

(72) Inventors: Andreas Mueller, Heidelberg (DE); Burkhard Wolf, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 6 days.

(21) Appl. No.: 15/921,722

(22) Filed: Mar. 15, 2018

(65) Prior Publication Data

US 2018/0304656 A1    Oct. 25, 2018

(30) Foreign Application Priority Data

Apr. 25, 2017   (DE) .................. 10 2017 206 920

(51) Int. Cl.
*B41J 29/02*   (2006.01)
*B41J 2/175*   (2006.01)
*B33Y 80/00*   (2015.01)

(52) U.S. Cl.
CPC .............. *B41J 29/02* (2013.01); *B33Y 80/00* (2014.12); *B41J 2/1752* (2013.01); *B41J 2202/14* (2013.01)

(58) Field of Classification Search
CPC .................. B41J 2202/14; B41J 2202/19; B41J 2202/20; B41J 29/02; B41J 2/1752; B33Y 80/00
See application file for complete search history.

(56) References Cited

U.S. PATENT DOCUMENTS

| 8,425,007 | B2 | 4/2013 | Von Essen |
| 9,718,286 | B2 | 8/2017 | Dolz et al. |
| 2006/0077225 | A1 | 4/2006 | Song et al. |
| 2009/0147048 | A1 | 6/2009 | Zhao et al. |
| 2010/0182382 | A1 | 7/2010 | Lee et al. |
| 2016/0375707 | A1* | 12/2016 | Elferink ................... B41J 29/02 347/40 |

FOREIGN PATENT DOCUMENTS

| DE | 102015211440 B3 | 4/2016 |
| EP | 1854635 A1 | 11/2007 |
| EP | 2287006 A1 | 2/2011 |
| WO | 2009142927 A1 | 11/2009 |
| WO | 2015144574 A2 | 10/2015 |

* cited by examiner

*Primary Examiner* — Jannelle M Lebron
(74) *Attorney, Agent, or Firm* — Laurence A. Greenberg; Werner H. Stemer; Ralph E. Locher

(57) ABSTRACT

A mounting device for a print head and a printing system allows print heads to be easily changed and easily and reliably adjusted. The mounting device includes a rigid mount and a frame for receiving a print head. The frame is releasably fixed to the rigid mount and includes an adjustment device for adjusting the print head relative to the rigid mount. The adjustment device of the frame includes two solid body joints and two actuators for adjusting the print head in two degrees of freedom, namely in a sliding movement along the rigid mount and a rotary movement about the vertical axis.

12 Claims, 5 Drawing Sheets

MOUNTING DEVICE FOR A PRINT HEAD, A MOUNTING ASSEMBLY AND A PRINTING SYSTEM

CROSS-REFERENCE TO RELATED APPLICATION

This application claims the benefit, under 35 U.S.C. § 119, of German patent application DE 10 2017 206 920.1, filed Apr. 25, 2017; the prior application is herewith incorporated by reference in its entirety.

BACKGROUND OF THE INVENTION

Field of the Invention

The invention relates to a mounting device for a print head, to a mounting assembly including multiple mounts, and to a printing system.

Digital printing machines have become known as an option for printing print small runs or individual prints on sheets and webs of paper and cardboard. When inkjet print heads are used, a respective printing substrate is moved past underneath the inkjet print heads at a minimum distance. Known sheet-transporting systems include revolving transport belts, for instance embodied as suction belts, rotating cylinders, also known as jetting cylinders, or revolving trays.

In machine concepts that use cylinders as disclosed, for instance in German patent DE 10 2015 211 440 B3 (corresponding to U.S. Pat. No. 9,718,286), multiple inkjet print heads are disposed at a radial distance above a jetting cylinder to print on sheets that are moved past at a short distance to the print heads.

One jetting cylinder may simultaneously hold multiple sheets by suction and transport them. To produce high-quality prints and avoid damage to the print heads, it is important to ensure that a respective sheet rests securely on the jetting cylinder.

To be able to print on wider printing substrates, it is common to provide multiple print heads disposed in next to one another in what is known as a print bar. Such a print bar includes multiple print heads and is disposed to be perpendicular to a direction of transport of the printing substrate. In general, to be able to print multiple colors, multiple print bars are disposed behind one another, each one printing a respective color.

To be able to print at a high degree of accuracy, it is necessary for the individual print heads in a print bar to be accurately positioned relative to one another. International patent disclosure WO 2009/142927 A1, corresponding to U.S. Pat. No. 8,425,007, discloses a print head mounting assembly suitable for aligning a mounted print head.

With the aid of this assembly a print head may be fixed next to another one on a frame to assemble a print bar. The assembly further allows individual defective print heads to be replaced by new functioning heads. Once the print head has been replaced, the new print head needs to be readjusted using the adjustment screws of the device.

A disadvantage of all these devices for aligning the print heads on the mount of a print bar is their expensive and complex multi-part design. Another disadvantage is that individual print heads are hard to change because the print heads are not easily accessible and difficult to handle. Since the print heads are difficult to grasp and hold and since there is not much installation space, only trained and qualified experts are capable of changing print heads. When print heads are changed, neighboring print heads in particular must not be damaged. Once the print heads have been changed, they need to be adjusted, in particular their rotary position about the vertical axis (Z), also referred to as the gear axis, needs to be adjusted. This adjustment can likewise only be made by qualified experts. Another disadvantage is that the precision mechanics approaches of the prior art are prone to contamination, for instance by ink.

SUMMARY OF THE INVENTION

An object invention is to provide a mounting device for print heads that allows print heads to be easily changed and easily and reliably adjusted and at least reduces the disadvantages of the prior art.

This object is attained by a mounting device that has the features described in the first independent claim.

The print head mounting device of the invention includes a rigid mount and a frame for receiving a print head, in particular an inkjet print head. The frame is releasably fixed to the solid and rigid mount. The frame has an adjustment device for adjusting the print head relative to the rigid mount. In accordance with the invention, the frame has two solid body joints and the adjustment device has two actuators for adjusting the print head in two degrees of freedom, namely a translatory movement along the rigid mount, i.e. a sliding movement along the x-axis, and a rotation about the vertical axis, i.e. the z-axis. The adjustment of the print head is achieved without a height change of the print head, i.e. the print head position along the z axis does not change.

This configuration having the two degrees of freedom that are adjustable independently of one another by solid body joints advantageously provides a mounting device that operates with great accuracy and is highly resistant to external forces. Contamination does not have any influence on the degree of accuracy. In addition, the mounting device has a high degree of repeat accuracy.

In accordance with a particularly advantageous and thus preferred embodiment of the mounting device of the invention, the frame surrounds a print head at the lateral outer surfaces of the print head, i.e. the print head is received at the center of the frame.

In accordance with a further development of the mounting device, the frame thereof has a stationary element fixed to the rigid mount and a further element that is deformable by the adjustment device. In this context, it is deemed to be particularly advantageous if the actuators are fixed to the stationary element of the frame and/or if the print head is fixed to—for instance screwed to—the deformable element of the frame. The arrangement of the actuators on the stationary element ensures that the position of the actuators remains unchanged during the adjustment movements, i.e. they do not change their position together with the print head.

In accordance with one possible embodiment, the actuator for the sliding movement along the rigid mount (i.e. in the direction of the x-axis) may be located in the axis of rotation of the frame for the rotation of a print head about the vertical axis (i.e. about the z-axis).

In accordance with a preferred embodiment of the mounting device, the first solid body joint thereof is configured as a solid body rotary joint and the second solid body joint is embodied as a solid body parallelogram joint.

In accordance with an advantageous further development, two reset springs may be provided on the frame of the mounting device to counteract the adjustment movement in the two degrees of freedom. This causes a resetting of the frame into a default position.

The actuators are preferably configured as cone drives, i.e. as cone-shaped or tapered or frustum-shaped rotary elements that may for instance engage in a slotted bore and widen the latter. Alternatively, motor-driven wedges, cams, spindles, differential thread spindles, or levers would be conceivable.

The invention proposes to manufacture the frame of the mounting device in one part in an additive manufacturing process also known as 3D printing.

Objects of the invention further include a mounting assembly that includes a plurality of the mounting devices described above to arrange a plurality of print heads next to one another in a print bar.

The invention further relates to a print bar having multiple mounting devices as described above for aligning print heads and a plurality of print heads for use in a digital printer or digital printing machine.

The invention further relates to a printing system having multiple mounting devices configured as described above.

As far as it makes sense from a technical point of view, combinations of the invention as described above and of the advantageous further developments of the invention likewise form advantageous further developments of the invention.

Further advantages and embodiments of the invention that are advantageous in constructional and functional terms will become apparent from the dependent claims and the description of exemplary embodiments with reference to the appended figures.

Other features which are considered as characteristic for the invention are set forth in the appended claims.

Although the invention is illustrated and described herein as embodied in a mounting device for a print head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention will be explained in more detail based on the appended figures. In the figures, elements and components that correspond to one another have the same reference symbols. For more clarity, the figures have not been drawn to scale.

DETAILED DESCRIPTION OF THE INVENTION

Figure 1:
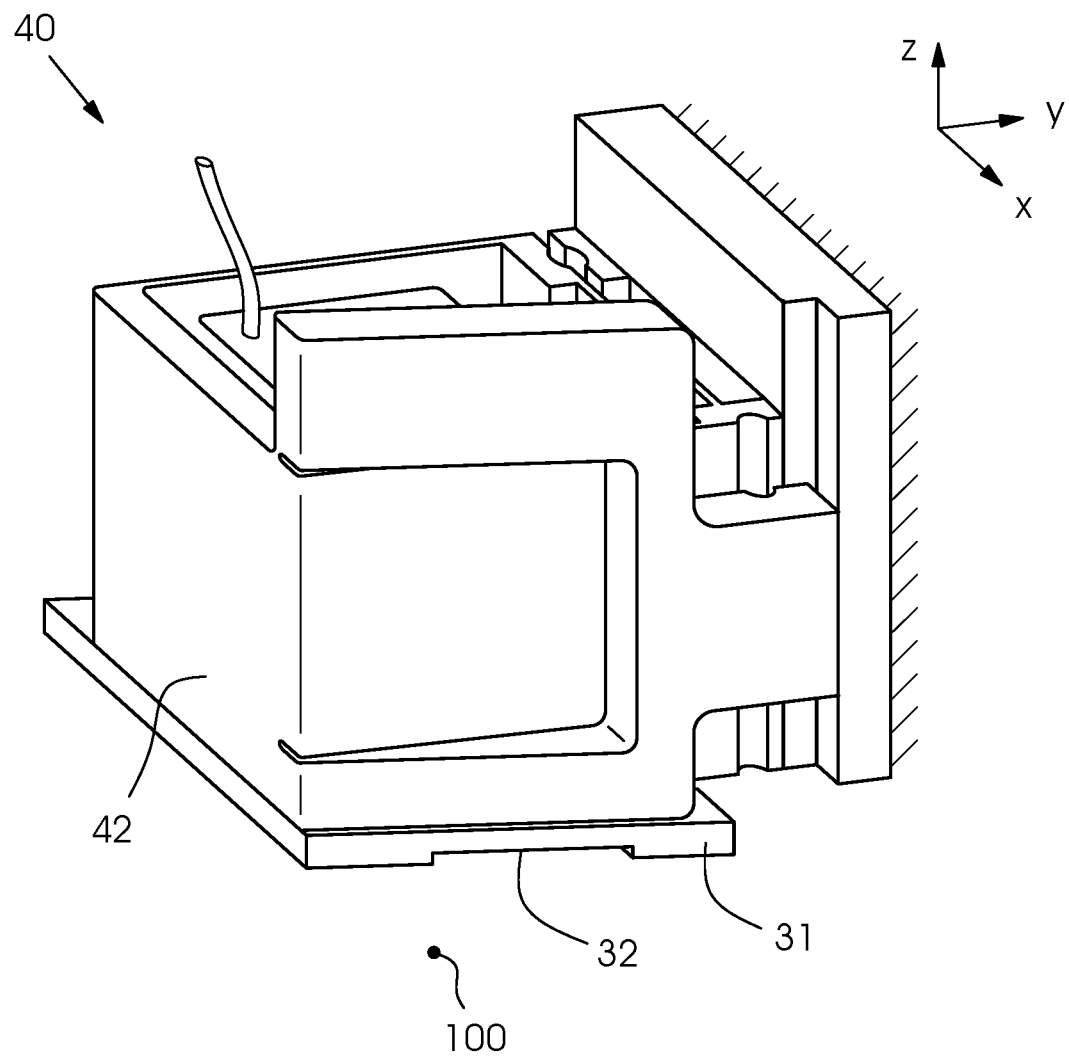
FIG. 1 is a diagrammatic, perspective view of a mounting device according to the invention.

Referring now to the figures of the drawings in detail and first, particularly to FIG. 1 thereof, there is shown an outline of a mounting device 40 and the design thereof. The mounting device 40 is used to adjustably receive a print head 31. For this purpose, the mounting device 40 has a frame 42 fixable to a rigid mount 41. The rigid mount 41 may be a part of the machine frame of a digital printing machine 10. The print head 31 is received by the frame 42 in such a way that the surfaces of the frame 42 surround the lateral surfaces of the print head 31, i.e. the print head is placed at the center of the frame 42. On its lower end, the print head 31 has a nozzle plate 32 that protrudes beyond the frame 42 of the mounting device 40. Tiny droplets may be discharged from the plurality of nozzles of the nozzle plate 32 to create an image on a sheet 100, which is located underneath the print head 31 and is not shown in any detail. Control cables and ink supply lines to the print head 31 are not shown in any detail in the drawing.

FIG. 1 further illustrates a Cartesian coordinate system with an x-axis, a y-axis, and a z-axis; the mounting device 40 allows the print head 31 to be adjusted in and against the x direction and to be rotated about the z-axis.

Figure 2:
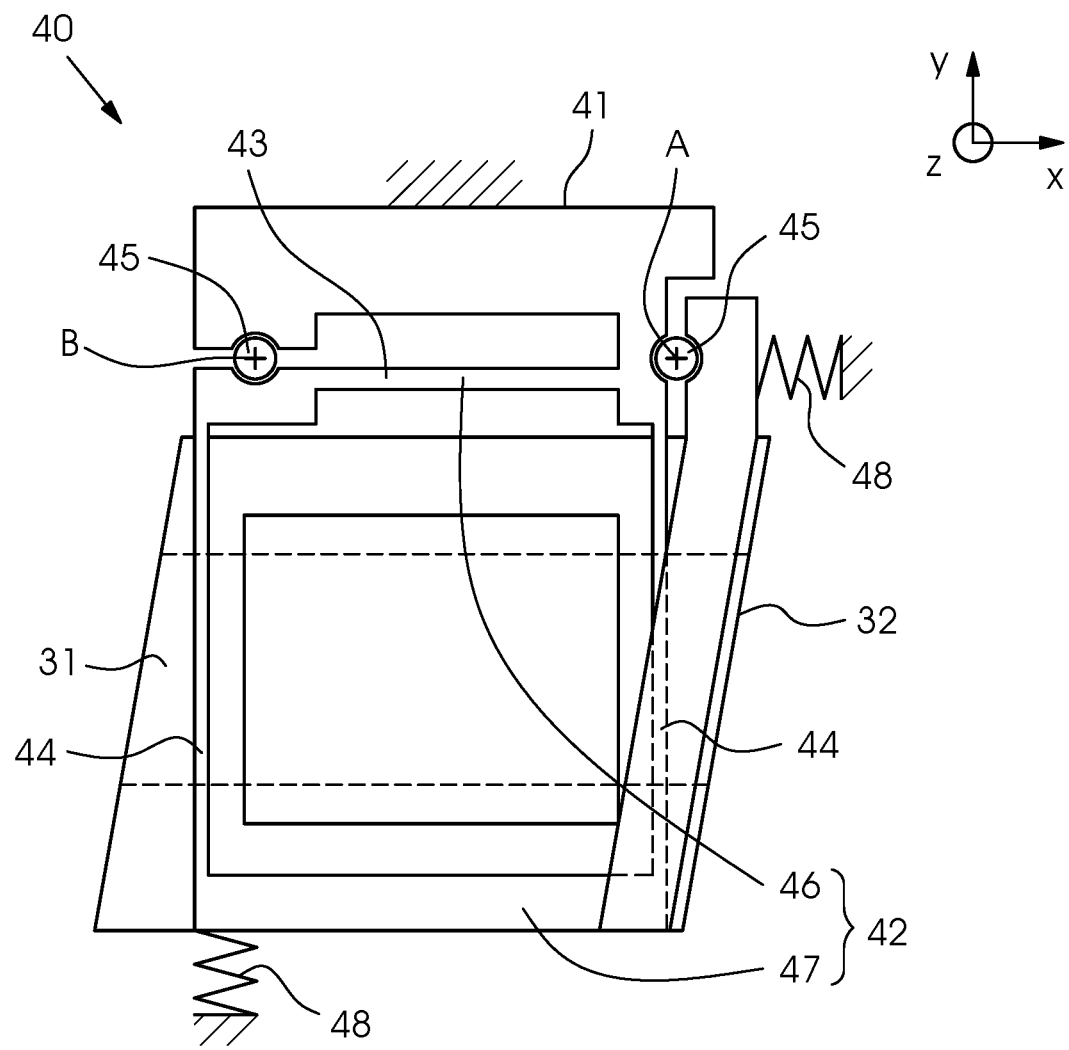
FIG. 2 is a top view of the mounting device.

A top view of the mounting device 40 is shown in FIG. 2. This representation illustrates the way in which the mounting device 40 works. The frame 42 has a stationary element 46, which is disposed adjacent to the rigid mount 41, and a deformable element 47, which actually allows the print head 31 to be adjusted. The frame 42 of the mounting device 40 has two degrees of freedom and allows a translatory movement in the x direction and a rotary movement about the z-axis. For this purpose, the frame 42 has two solid body joints 43, 44: a first one is embodied as a solid body rotary joint 43 and provides the rotary movement about the z-axis. A second one is embodied as a solid body parallelogram joint 44 and provides the translatory movement in the x direction. The elastic deformation of the solid body joints 43, 44 is caused by two actuators 45. The actuator 45, which provides the translatory movement in the x direction, i.e. the deformation of the solid body parallelogram joint 44, is in position A, which is also the position of the pivot point of the frame 42, namely of the solid body rotary joint 43. The actuator 45 for the rotation about the vertical z-axis, i.e. for deforming the solid body rotary joint 43, is in position B.

Reset springs 48, which act on the frame 42, cause the frame 42 to be reset into its original position shown in FIG. 2.

Figure 3A:
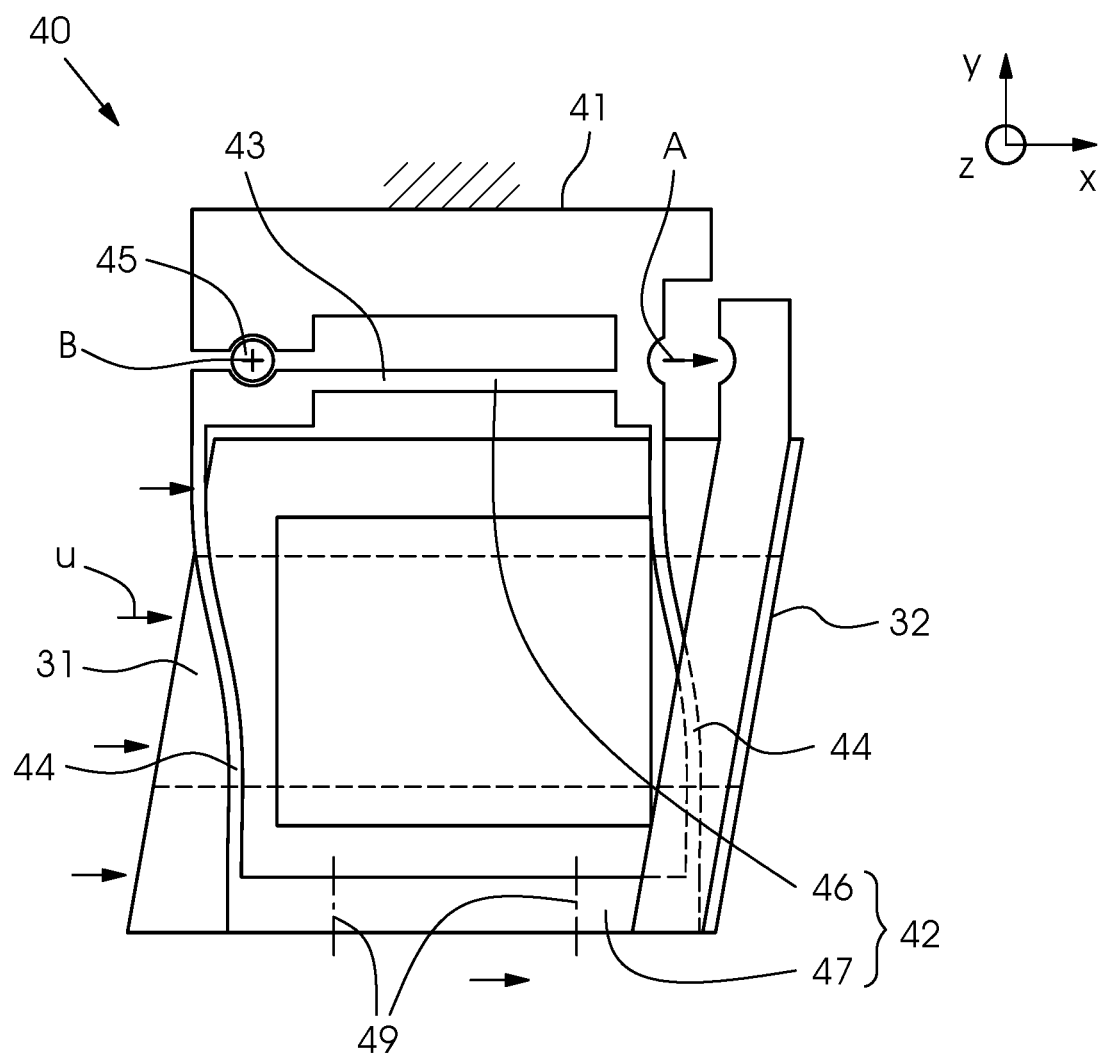
FIGS. 3A and 3B are illustrations of two alternative adjustment positions of the mounting device.
Figure 3B:
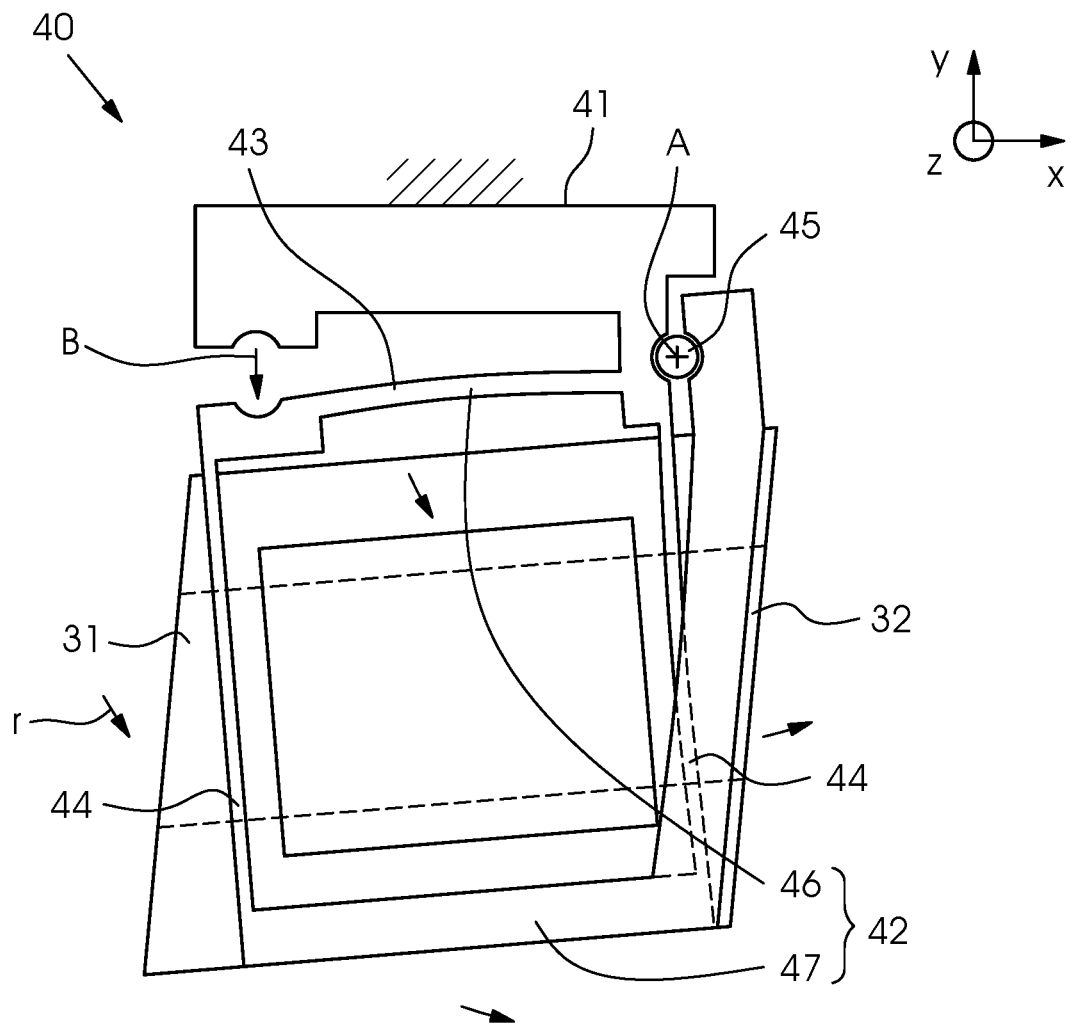

FIGS. 3A and 3B illustrate how adjustment of a print head 31 is achieved by means of the mounting device 40. A print head 31 is connected to—for instance screwed to—the deformable element 47 of the frame 42 in connecting points 49. This causes the print head 31 to follow the movement of the frame 42.

FIG. 3A illustrates a sliding movement v of the print head 31, namely a translatory movement in the x direction. For this purpose the solid body parallelogram joint 44 is deformed by the actuator 45, which is in position A.

FIG. 3B illustrates a rotary movement r of the print head 31. The rotary movement r is a rotation about the vertical axis, i.e. the z-axis. It is caused by a corresponding actuation of the actuator 45, which is in position B and causes a deformation of the solid body rotary joint 43 and a rotation of the frame 42 about position A as the pivot point or instantaneous center of rotation. While the translatory movement v and the rotary movement r are illustrated independently of one another in FIGS. 3A and 3B, both movements v, r may—if required—be combined by a suitable actuation of the two actuators 45 located in positions A and B.

Figure 4:
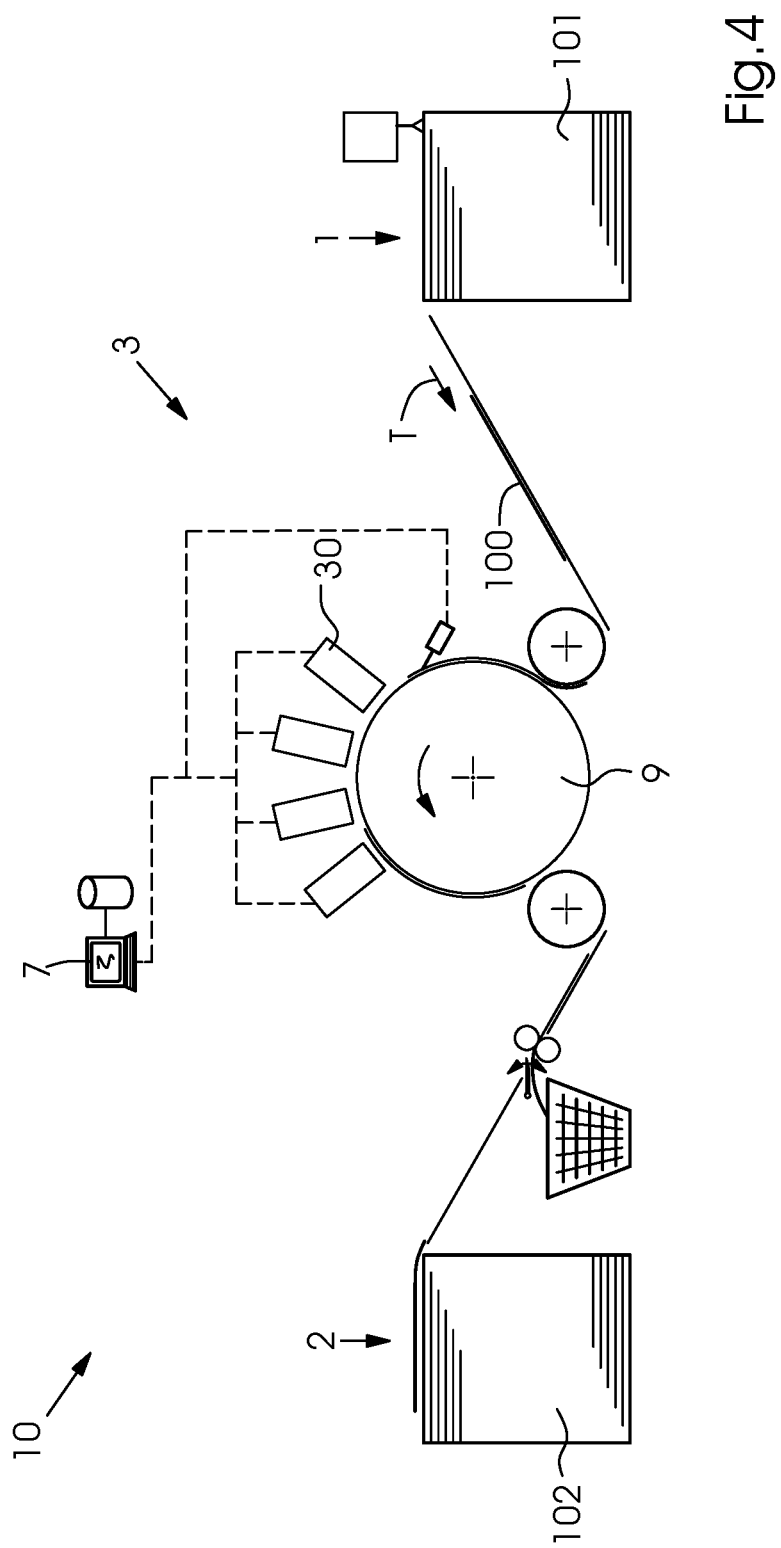
FIG. 4 is an illustration a digital printing machine for using the device of the invention.

FIG. 4 illustrates a digital printing machine 10 for printing on sheets 100. The digital printing machine 10 has a digital printing unit 3, which includes a plurality of inkjet print bars 30 disposed behind one another in a direction of transport T. Coming from a feeder stack 101 in a sheet feeder 1, the sheets 100 are transported to the digital printing unit 3 in a direction of transport T by transport elements such as transport belts and transport rollers, which are not shown in any detail herein. The sheets 100 are transported through the digital printing unit 3 by a jetting cylinder 9 on which they rest. As the jetting cylinder 9 rotates, the sheets 100 are moved past underneath the inkjet print heads of the print bar 30 and may be printed on in the process. The inkjet print heads 38 are actuated by a machine control unit 7. A waste deflector for removing defective sheets is provided downstream of the jetting cylinder as viewed in the direction of transport T. Good sheets are moved forward to be delivered to a delivery stack 102 in a sheet delivery 2.

The following is a summary list of reference numerals and the corresponding structure used in the above description of the invention:
1 feeder
2 delivery
3 printing unit
7 machine control unit
9 jetting cylinder
10 digital printing machine
30 print bar
31 print head
32 nozzle plate
40 mounting device
41 rigid mount
42 frame
43 solid body rotary joint
44 solid body parallelogram joint
45 actuator
46 stationary element
47 deformable element
48 reset spring
49 frame/print head connecting point
100 sheet
101 feeder stack
102 delivery stack
r rotary movement
v translatory movement
A position 1 actuator and pivot point
B position 2 actuator
T direction of transport

The invention claimed is:

1. A mounting device for a print head, the mounting device comprising:
    a rigid mount; and
    a frame for receiving the print head, said frame releasably fixed to said rigid mount and said frame having an adjustment device for adjusting the print head relative to said rigid mount, said adjustment device of said frame having two solid body joints and two actuators for adjusting the print head in two degrees of freedom, including a translatory movement along said rigid mount and a rotary movement about a vertical axis, said actuator for the translatory movement along said rigid mount being disposed on an axis of rotation of said frame for the rotary movement of the print head about the vertical axis.

2. The mounting device according to claim 1, wherein an adjustment of the print head occurs without any height change of the print head.

3. The mounting device according to claim 1, wherein said frame surrounds the print head at lateral outer surfaces of the print head.

4. The mounting device according to claim 1, wherein said frame includes a stationary element fixed to said rigid mount and a further element that is deformable by means of said adjustment device.

5. The mounting device according to claim 4, wherein said actuators are fixed to said stationary element of said frame and do not change their positions during adjustment movements.

6. The mounting device according to claim 1, wherein a first of said solid body joints is a solid body rotary joint and a second of said solid body joints is a parallelogram joint.

7. The mounting device according to claim 1, wherein said frame has two reset springs for counteracting an adjustment in the two degrees of freedom.

8. The mounting device according to claim 1, wherein said actuators are cone drives.

9. The mounting device according to claim 1, wherein said frame is manufactured in an additive manufacturing process.

10. The mounting device according to claim 1, wherein the print head is an inkjet print head.

11. A mounting assembly, comprising:
    a plurality of mounting devices each having a rigid mount and a frame for receiving a respective print head, said frame releasably fixed to said rigid mount and said frame having an adjustment device for adjusting the respective print head relative to said rigid mount, said adjustment device of said frame having two solid body joints and two actuators for adjusting the respective print head in two degrees of freedom, including a translatory movement along said rigid mount and a rotary movement about a vertical axis, said actuator for the translatory movement along said rigid mount being disposed on an axis of rotation of said frame for the rotary movement of the print head about the vertical axis, the print heads disposed adjacent to one another defining a print bar.

12. A printing system, comprising:
    a plurality of print heads; and
    a mounting assembly containing a plurality of mounting devices each having a rigid mount and a frame for receiving one of said print heads, said frame releasably fixed to said rigid mount and said frame having an adjustment device for adjusting said one print head relative to said rigid mount, said adjustment device of said frame having two solid body joints and two actuators for adjusting said one print head in two degrees of freedom, including a translatory movement along said rigid mount and a rotary movement about a vertical axis, said actuator for the translatory movement along said rigid mount being disposed on an axis of rotation of said frame for the rotary movement of the print head about the vertical axis, said print heads disposed adjacent to one another defining a print bar.

* * * * *